United States Patent [19]

Watanabe et al.

[11] 4,453,724
[45] Jun. 12, 1984

[54] FUEL TANK CONSTRUCTION OF MOTOR VEHICLE

[75] Inventors: Hiroyuki Watanabe; Yasushi Tanaka, both of Toyota, Japan

[73] Assignee: Toyota Jidosha Kogyo Kabushiki Kaisha, Aichi, Japan

[21] Appl. No.: 382,552

[22] Filed: May 27, 1982

[30] Foreign Application Priority Data

Jun. 12, 1981 [JP] Japan .................................. 56-90276

[51] Int. Cl.³ ............................................. B60K 15/02
[52] U.S. Cl. .................................................. 280/5 A
[58] Field of Search ............... 280/5 A, 5 R; 296/208; 180/89.1, 314

[56] References Cited

U.S. PATENT DOCUMENTS 3,285,359 11/1966 Weeks et al. ..................... 280/5 A
4,357,027 11/1982 Zeitlow ............................. 280/5 A Primary Examiner—John A. Pekar
Attorney, Agent, or Firm—Parkhurst & Oliff

[57] ABSTRACT

A fuel tank construction of a motor vehicle, wherein a fuel tank disposed in a tunnel projecting upwardly from the surface of a floor panel, opening downwardly, disposed in the longitudinal direction of the vehicle and formed at the central portion in the widthwise direction of the floor panel is of such an arrangement that a pair of upper and lower tanks being of substantially triangular shapes are welded into a substantially square shape in cross section to form the fuel tank and seam portions formed by the welding are located at opposite corner portions and on one of diagonal lines of a space formed by the substantially square shape.

4 Claims, 5 Drawing Figures

FUEL TANK CONSTRUCTION OF MOTOR VEHICLE

BACKGROUND OF THE INVENTION

1. Field of the Invention

This invention relates to a fuel tank construction of a motor vehicle, wherein a tunnel upwardly projecting from a floor panel, downwardly opening and disposed in the longitudinal direction of the vehicle is formed at the central portion in the widthwise direction of the floor panel, and a fuel tank is disposed in the tunnel.

2. Description of the Prior Art

In general, in a motor vehicle, particularly, a passenger vehicle, a fuel tank has been disposed at the back of seats disposed at the rear end of a space occupied by occupants, whereby there have been imposed limits on the utilization of a space in the rear portion of the vehicle by the space occupied by the fuel tank.

To solve the above-described problems it is conceivable that, in a rear engine—rear wheel drive type motor vehicle, a front engine—front wheel drive type motor vehicle or the like, i.e., a motor vehicle M (Refer to FIG. 1) in which a propeller shaft does not longitudinally traverse a floor panel 1 of the vehicle therebeneath, a tunnel 2 upwardly projecting from the surface of a floor panel 1, downwardly opening and disposed in the longitudinal direction of the vehicle is formed at the central portion in the widthwise direction of the floor panel 1, and a fuel tank 3 is disposed in the tunnel 2, so that effective utilization of the space in the rear portion of the vehicle can be enhanced and further reduced total length of the vehicle and decreased weight of the vehicle can be attained.

In the motor vehicle of the type described, the fuel tank 3 is adapted to be disposed in the tunnel 2 having a space of a substantially square shape in cross section. In this case, with the conventional fuel tank as shown in FIG. 2 for example, when the seam portions 4 are disposed in the vehicle direction, a large space is formed between the top surface of the tunnel 2 and the fuel tank 3, and when the seam portions 4 are disposed in the horizontal direction as shown in FIG. 3, large spaces must be formed between the opposing side surfaces of the tunnel 2 and the fuel tank 3. In either case, there is posed a problem that the effective utilization of the space remains low.

SUMMARY OF THE INVENTION

It is therefore the primary object of the present invention to provide a fuel tank construction of a motor vehicle, wherein the space can be effectively utilized in a space of a substantially square shape in cross-section when a fuel tank is disposed therein.

It is another object of the present invention to provide a fuel tank construction of a motor vehicle, wherein the space can be effectively utilized and the fuel tank can be maximized in capacity.

It is a further object of the present invention to provide a fuel tank construction of a motor vehicle, wherein the fuel tank can be constituted by the upper and the lower tanks being of substantially triangular shapes in cross section, such an advantage can be also offered that drawing by use of a press is facilitated.

To achieve one of the above-described objects, the present invention contemplates that a fuel tank construction of a motor vehicle, wherein a fuel tank is disposed in a space being of a substantially square shape in cross-section, is of such an arrangement that a pair of upper and lower tanks being of substantially triangular shapes are welded into a substantially square shape in cross section to form the fuel tank, and seam portions formed by the welding are located at opposite corner portions on one of diagonal lines of the square shape of the space.

To achieve one of the above-described objects, the present invention contemplates that, in the above-described fuel tank construction of a motor vehicle, the lower end of the fuel tank is disposed at a position higher than the bottom surface of said space.

To achieve one of the above-described objects, the present invention contemplates that, in the above-described fuel tank construction of a motor vehicle, a hollow space is formed in a tunnel projecting upwardly from the surface of a floor panel, opening downwardly, disposed in the longitudinal direction of the vehicle and formed at the central portion in the widthwise direction of said floor panel.

To achieve one of the above-described objects, the present invention contemplates that, in the above-described fuel tank construction of a motor vehicle, said fuel tank is hung up by tank bands by way of the bottom surface of said fuel tank in said tunnel, whereby said fuel tank is supported to urge a shock absorbing material interposed between the inner peripheral surface of said tunnel and the upper and side surfaces of the fuel tank.

To achieve one of the above-described objects, the present invention contemplates that, in the above-described fuel tank construction of a motor vehicle, parts of said seam portion disposed in the vicinity of said tank bands are projected within a range of not interfering with said tank bands.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of an embodiment of the present invention with reference to the drawings.

Figure 4:
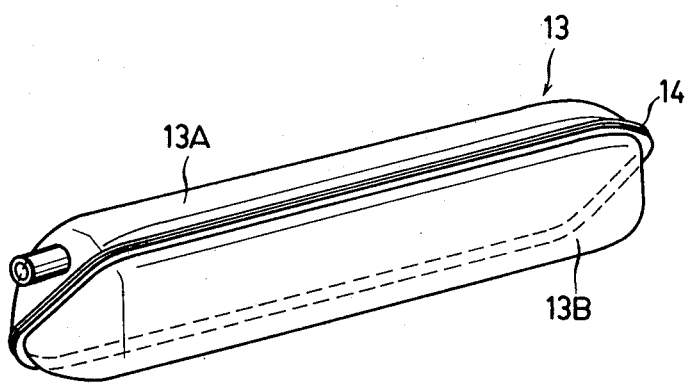
FIG. 4 is a perspective view showing the fuel tank in the embodiment of the fuel tank construction of the motor vehicle according to the present invention.
Figure 5:
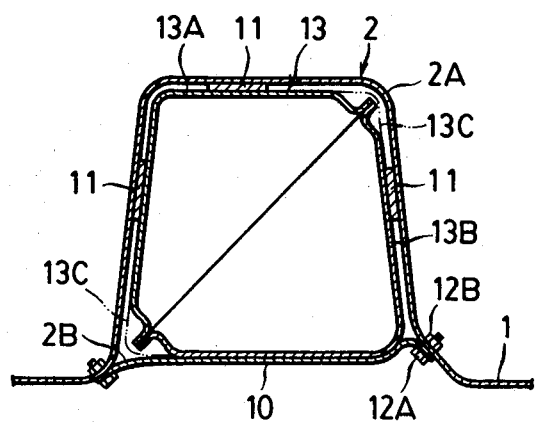
FIG. 5 is a sectional view showing the embodiment.

As shown in FIGS. 4 and 5, in this embodiment, a pair of upper tank 13A and lower tank 13B being of substantially triangular shapes are welded into a substantially square shape in cross-section, and the fuel tank 13 is arranged in such a manner that seam portions 14 formed by the welding are located at opposite corner portions 2A and 2B on one of diagonal lines of the space being of the substantially square shape.

In the aforesaid fuel tank 13, the outer peripheral ends of the seam portions 14 are arranged in a manner not to outwardly project from hypothetical outer shape lines when the seam portions 14 would not be provided. In other words, the base end portions of the seam portions 14 are bent to positions inwardly of the hypothetical outer shape lines 13C.

In consequence, the seam portions 14 of the fuel tank 13 arranged as shown in FIG. 4 are spaced the same distance from the inner peripheral surface of the tunnel 2 as that at portions of the fuel tank 13 where no seam portions 14 are present, whereby the space in the tunnel 2 is effectively utilized, and the seam portions 14 and the tunnel 2 do not interfere with each other.

Additionally, the bottom surface of the fuel tank 13 are positioned higher than the bottom surface of the floor panel 1 as being the bottom surface of the internal space of the tunnel 2, so that, when the vehicle runs onto an obstacle, the vehicle can be prevented from being damaged by the obstacle.

Figure 1:
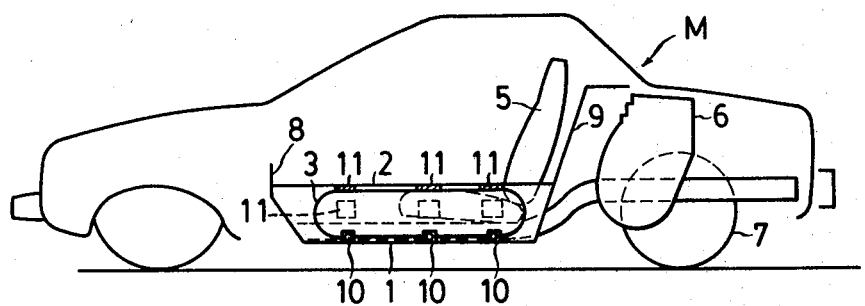
FIG. 1 is a schematic sectional view showing the motor vehicle to which is to be applied the present invention.
Figure 2:
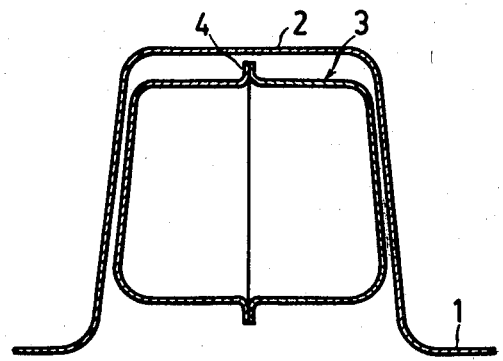
FIGS. 2 and 3 are sectional views showing the conventional fuel tank construction.
Figure 3:
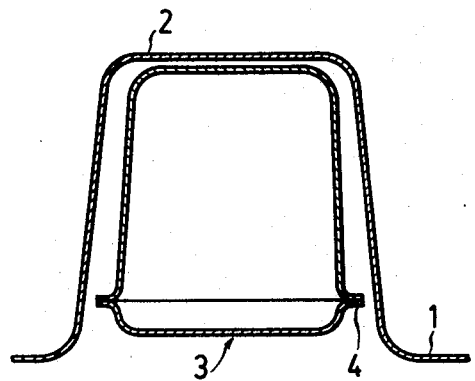

In FIG. 1, designated at 5 is an occupant's seat, 6 an engine, 7 a rear wheel, 8 a dash panel and 9 a back panel, respectively.

Here, similarly to the aforesaid fuel tank 3 shown in FIG. 1, the fuel tank 13 is hung up by tank bands 10 at three portions in the longitudinal direction of the vehicle, whereby the fuel tank 13 urges a shock absorbing material 11 interposed between the inner side surface of the tunnel 2 and the upper and side surfaces thereof, so that the fuel tank 13 can be stably supported. In FIG. 5, reference numerals 12A and 12B show bolts and nuts for mounting one of the tank band 10.

With the above-described arrangement, the embodiment of the present invention can offer the outstanding advantages that the effective utilization of the space can be enhanced and the fuel tank can be maximized in capacity. Since the fuel tank can be constituted by the upper and the lower tanks being of substantially triangular shapes in cross-section, such an advantage can be also offered that drawing by use of a press is facilitated.

It should be apparent of those skilled in the art that the abovedescribed embodiment is merely representative, which represent the applications of the principles of the present invention. Numerous and varied other arrangements can be readily devised by those skilled in the art without departing from the spirit and the scope of the invention.

What is claimed is:

1. A motor vehicle fuel tank structure comprising:
   a motor vehicle floor panel having a width and length and normally positioned such that the length of said floor panel extends along a length of a motor vehicle, said floor panel including a tunnel projecting upwardly from said floor panel to form an upper portion and opening downwardly while extending along the length of said floor panel at a position central to the width of said floor panel;
   a fuel tank having first and second triangularly-shaped cross-sections coupled to interface one another to form a fuel tank of substantially square-shaped cross-section having an upper portion and lower portion and having seams formed by the interface of said triangular sections, said tank being disposed within said tunnel such that the square configuration of the fuel tank conforms to the square configuration of said tunnel and the seams are generally disposed adjacent diagonal corners of the square configuration of said tunnel;
   means for absorbing shock interposed between said fuel tank upper portion and the upper portion of said tunnel; and
   means forming bands for supporting the bottom portion of said fuel tank for retaining said fuel tank in said tunnel and urging said fuel tank upper portion against the interposed shock absorbing material.

2. The fuel tank structure of claim 1 wherein said seams formed by the interface of said sections are recessed so as not to interfere with the bands supporting said fuel tank.

3. A motor vehicle fuel tank structure comprising:
   means forming a motor vehicle fuel tank mounting space having a generally square-shaped cross-sectional configuration having an elongate upper surface and opening downwardly from said upper surface;
   a fuel tank having two elongate sections of triangular cross-sectional configuration coupled to interface one another to form a fuel tank of generally square cross-sectional configuration and having seams at the interface between said sections, each of said seams being recessed with respect to an outline of said square cross-sectional configuration and being disposed within said space such that the seams are adjacent diagonal corners of the square configuration; and
   means for supporting and retaining said fuel tank within said space.

4. A motor vehicle fuel tank structure comprising:
   a motor vehicle floor panel having a downwardly opening channel extending along a length thereof formed by adjacent sides and an interconnected upper surface having a generally square configuration and opening downwardly with respect to said floor panel;
   a fuel tank having first and second sections of generally triangular cross-section coupled to one another to form a fuel tank of generally square-shaped cross-sectional configuration wherein seams are formed along the interface of said triangular cross-sections, said seams being recessed such that they fall within the general outline of the square-shaped configuration; and
   means for supporting and retaining said fuel tank within said channel such that the generally square cross-sectional configuration of said tank conforms to the generally square configuration of said channel so that the seams lie adjacent and extend along the corners of said channel.

* * * * *